United States Patent
Zhong et al.

(10) Patent No.: US 9,106,333 B2
(45) Date of Patent: Aug. 11, 2015

(54) METHOD AND APPARATUS FOR TESTING OPTICAL FIBER AND PASSIVE OPTICAL NETWORK SYSTEM

(71) Applicant: Huawei Technologies Co., Ltd., Shenzhen (CN)

(72) Inventors: Degang Zhong, Wuhan (CN); Zebin Li, Shenzhen (CN); Changliang Yu, Wuhan (CN); Shengping Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 13/894,767

(22) Filed: May 15, 2013

(65) Prior Publication Data
US 2013/0259470 A1 Oct. 3, 2013

Related U.S. Application Data

(63) Continuation of application No. PCT/CN2012/073092, filed on Mar. 27, 2012.

(51) Int. Cl.
| | |
|---|---|
| *H04B 10/08* | (2006.01) |
| *H04B 17/00* | (2015.01) |
| *H04B 10/07* | (2013.01) |
| *H04B 10/071* | (2013.01) |

(52) U.S. Cl.
CPC ............ *H04B 10/07* (2013.01); *H04B 10/071* (2013.01)

(58) Field of Classification Search
USPC .................... 398/16, 17, 21, 33, 38
See application file for complete search history.

(56) References Cited

U.S. PATENT DOCUMENTS

| | | | |
|---|---|---|---|
| 5,530,923 A * | 6/1996 | Heinonen et al. | 455/126 |
| 6,919,550 B2 | 7/2005 | Heineke et al. | |
| 2006/0067713 A1 | 3/2006 | Farooqui et al. | |
| 2006/0127086 A1 * | 6/2006 | Frankel | 398/19 |

(Continued)

FOREIGN PATENT DOCUMENTS

| | | |
|---|---|---|
| CN | 1581735 A | 2/2005 |
| CN | 201118599 Y | 9/2008 |

(Continued)

OTHER PUBLICATIONS

International Search Report and Written Opinion of the International Searching Authority issued in corresponding PCT Patent Application No. PCT/CN2012/073092, mailed Dec. 20, 2012.

*Primary Examiner* — David Payne
*Assistant Examiner* — Pranesh Barua
(74) *Attorney, Agent, or Firm* — Brinks Gilson & Lione (57) ABSTRACT

A method for testing an optical fiber includes: receiving a test optical signal from an optical fiber network, and converting the test optical signal into a test current signal; receiving, by a transimpedance amplifier, the test current signal by using a first working mode and outputting a first test voltage signal; acquiring a swing of the first test voltage signal, and determining whether the swing of the first test voltage signal meets a preset condition; and receiving, by the transimpedance amplifier, the test current signal by using a second working mode and outputting a second test voltage signal when the swing of the first test voltage signal meets the preset condition, where an upper limit and a lower limit of a receiver dynamic range when the transimpedance amplifier works in the first working mode are different from those when the transimpedance amplifier works in the second working mode.

13 Claims, 5 Drawing Sheets

(56) References Cited

U.S. PATENT DOCUMENTS

| | | |
|---|---|---|
| 2006/0202765 A1* | 9/2006 | Gan et al. .................. 330/308 |
| 2009/0274011 A1* | 11/2009 | Fujisawa .................. 368/47 |
| 2010/0183296 A1* | 7/2010 | De Langen et al. ........... 398/16 |
| 2011/0013904 A1 | 1/2011 | Khermosh et al. |
| 2011/0026571 A1* | 2/2011 | Han et al. .................. 375/224 |
| 2012/0020672 A1* | 1/2012 | Aguren .................. 398/139 |
| 2013/0051791 A1 | 2/2013 | Zhao et al. |

FOREIGN PATENT DOCUMENTS

| | | |
|---|---|---|
| CN | 101660944 A | 3/2010 |
| CN | 101819229 A | 9/2010 |
| CN | 101997499 A | 3/2011 |
| CN | 102356571 A | 2/2012 |
| JP | 2001211035 A | 8/2001 |

* cited by examiner

METHOD AND APPARATUS FOR TESTING OPTICAL FIBER AND PASSIVE OPTICAL NETWORK SYSTEM

CROSS-REFERENCE TO RELATED APPLICATIONS

This application is a continuation of International Application No. PCT/CN2012/073092, filed on Mar. 27, 2012, which is hereby incorporated by reference in its entirety.

FIELD

The present disclosure relates to the field of optical fiber testing, and in particular, to a method and an apparatus for testing an optical fiber and a passive optical network (Passive Optical Network, PON) system.

BACKGROUND

Currently, with the acceleration of the replacement of copper cables with optical fiber cables, construction of passive optical networks develops quickly, and therefore installation, acceptance testing, and routine maintenance need to be performed for the PONs. In addition, an optical time domain reflectometer (Optical Time Domain Reflectometer, OTDR) plays an important role in fiber network testing, fault locating, rectifying, and the like.

The OTDR needs to be capable of detecting extremely weak and extremely strong test signals. Therefore, it is required that a transimpedance amplifier (Transimpedance Amplifier, TIA) in the OTDR system have a high sensitivity and a large receiver dynamic range. In one aspect, improvement of the TIA sensitivity easily results in receiver saturation when a TIA input signal is relatively strong, and in another aspect, due to a limitation of an existing power supply capability, the receiver dynamic range of the TIA cannot be further enlarged. Therefore, a detection range of an OTDR test signal is relatively small in the prior art.

SUMMARY

To solve the above problem, embodiments of the present disclosure provide a method and an apparatus for testing an optical fiber, and in addition, the embodiments of the present disclosure further provide a passive optical network system.

A method for testing an optical fiber includes: receiving a test optical signal from an optical fiber network, and converting the test optical signal into a test current signal; receiving, by a transimpedance amplifier, the test current signal by using a first working mode and outputting a first test voltage signal; acquiring a swing of the first test voltage signal, and determining whether the swing of the first test voltage signal meets a preset condition; and receiving, by the transimpedance amplifier, the test current signal by using a second working mode and outputting a second test voltage signal when the swing of the first test voltage signal meets the preset condition, where an upper limit and a lower limit of a receiver dynamic range when the transimpedance amplifier works in the first working mode are different from those when the transimpedance amplifier works in the second working mode.

An apparatus for testing an optical fiber includes: an optical detector, configured to receive a test optical signal from an optical fiber network, and convert the test optical signal into a test current signal; and a transimpedance amplifier, connected to the optical detector and configured to receive the test current signal by using a first working mode and convert the test current signal into a first test voltage signal, and receive the test current signal by using a second working mode and convert the test current signal into a second test voltage signal when a swing of the first test voltage signal meets a preset condition, where when working in the first working mode and the second working mode, the transimpedance amplifier respectively has a first receiver dynamic range and a second receiver dynamic range, and an upper limit and a lower limit of the first receiver dynamic range are different from those of the second receiver dynamic range.

A passive optical network system includes: an optical line terminal and multiple optical network units, where the optical line terminal is connected to the multiple optical network units in point-to-multipoint mode through an optical distribution network, the optical line terminal includes an optical transceiver module, and the optical transceiver module includes the apparatus for testing an optical fiber.

In the method and apparatus for testing an optical fiber and the system that are provided by the embodiments of the present disclosure, a transimpedance amplifier has two different working modes, namely, a first working mode and a second working mode, where upper limits and lower limits of receiver dynamic ranges of the transimpedance amplifier in the first working mode and the second working mode are different. In addition, the transimpedance amplifier may, according to a swing of an output voltage, switch over to a corresponding working mode to meet a receiving requirement of different input power. A switchover between the working modes is equivalent to moving a receiver dynamic range of the transimpedance amplifier according to an actual test requirement, so that a valid detection range of the transimpedance amplifier is equivalent to covering a dynamic receiver range in the first working mode and a dynamic receiver range in the second working mode. Therefore, compared with the prior art, solutions provided by the embodiments of the present disclosure are capable of effectively enlarging a valid detection range for optical fiber detection.

BRIEF DESCRIPTION OF THE DRAWINGS

To describe the solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION OF THE EMBODIMENTS

The following clearly describes the solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
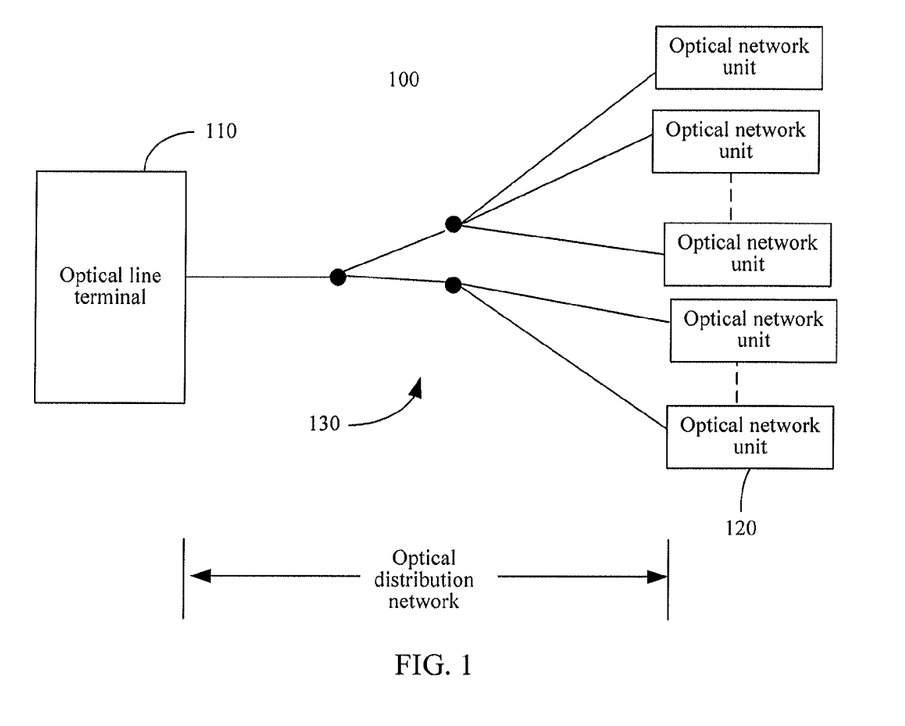
FIG. 1 is a schematic structural diagram of a passive optical network system according to an embodiment of the present disclosure.

For better understanding of the present disclosure, the following firstly describes a structure of a passive optical network (PON) system to which a method for testing an optical fiber provided by this application is applicable. Referring to FIG. 1, a passive optical network system 100 may include at least one optical line terminal 110, multiple optical network units 120, and one optical distribution network 130. The optical line terminal 110 is connected to the multiple optical network units 120 in point-to-multipoint mode through the optical distribution network 130, where a direction from the optical line terminal 110 to the optical network units 120 is defined as a downlink direction, and a direction from the optical network units 120 to the optical line terminal 110 is an uplink direction.

The passive optical network system 100 may be a communications network that implements, without any active component, data distribution between the optical line terminal 110 and the optical network units 120. For example, in a specific embodiment, the data distribution between the optical line terminal 110 and the optical network units 120 can be implemented by using a passive optical component (such as an optical splitter) in the optical distribution network 130. In addition, the passive optical network system 100 may be an asynchronous transfer mode passive optical network (ATM PON) system or a broadband passive optical network (BPON) system defined by the ITU-T G.983 standard, a gigabit-capable passive optical network (GPON) system defined by the ITU-T G.984 standard, an Ethernet passive optical network (EPON) defined by the IEEE 802.3ah standard, or a next generation passive optical network (NGA PON such as XGPON or 10G EPON). Various passive optical network systems defined by the standards are hereby incorporated by reference in their entireties.

The optical line terminal 110 is generally in a central location (such as a central office Central Office, CO), and it is capable of performing unified management of the multiple optical network units 120, and transmitting data between the optical network units 120 and an upper-layer network (not shown in the figure). Specifically, the optical line terminal 110 may serve as a medium between the optical network units 120 and the upper-layer network, forwards data received from the upper-layer network to the optical network units 120, and forwards data received from the optical network units 120 to the upper-layer network. A specific structural configuration of the optical line terminal 110 may vary depending on a specific type of the passive optical network system 100. For example, in an embodiment, the optical line terminal 110 may include an optical transceiver module configured to send downlink optical signals to the optical network units 120 and receive uplink optical signals from the optical network units 120, where the downlink optical signals and the uplink optical signals can be transmitted through the optical distribution network 130. In addition, the optical transceiver module may further be configured to send a test optical signal to the optical distribution network 130, where the test optical signal is backscattered or reflected at a test point (such as an optical connection point, an optical connector, or an optical fiber bending or breaking place) of the optical distribution network 130, and returned to the optical line terminal 110 along the original path. The optical transceiver module is capable of further receiving the test optical signal returned from the optical distribution network 130. In a specific embodiment, the optical transceiver module may be separately configured as a pluggable optical module.

The optical network units 120 may be arranged in locations (such as a user premises) of a user side in distributed mode. The optical network units 120 may be network devices that are configured to communicate with the optical line terminal 110 and a user, and specifically, the optical network units 120 may serve as media between the optical line terminal 110 and the user. For example, the optical network units 120 may forward data received from the optical line terminal 110 to the user, and forward data received from the user to the optical line terminal 110. It should be understood that a structure of the optical network unit 120 is similar to that of an optical network terminal (Optical Network Terminal, ONT). Therefore, in the solutions provided by this application document, an optical network unit and an optical network terminal can be replaced with each other.

The optical distribution network 130 may be a data distribution system, and it may include an optical fiber, an optical coupler, an optical splitter and/or other devices. In an embodiment, the optical fiber, optical coupler, optical splitter and/or other devices may be a passive optical component, and specifically, the optical fiber, optical coupler, optical splitter and/or other devices may be a component that distribute data signals between the optical line terminal 110 and the optical network units 120 and do not need to be supported by a power supply. In addition, in another embodiment, the optical distribution network 130 may further include one or more processing devices such as an optical amplifier or a relay device (Relay device). In addition, the optical distribution network 130 may specifically be extended from the optical line terminal 110 to the multiple optical network units 120, but may also be configured as any other point-to-multipoint structure.

Figure 2:
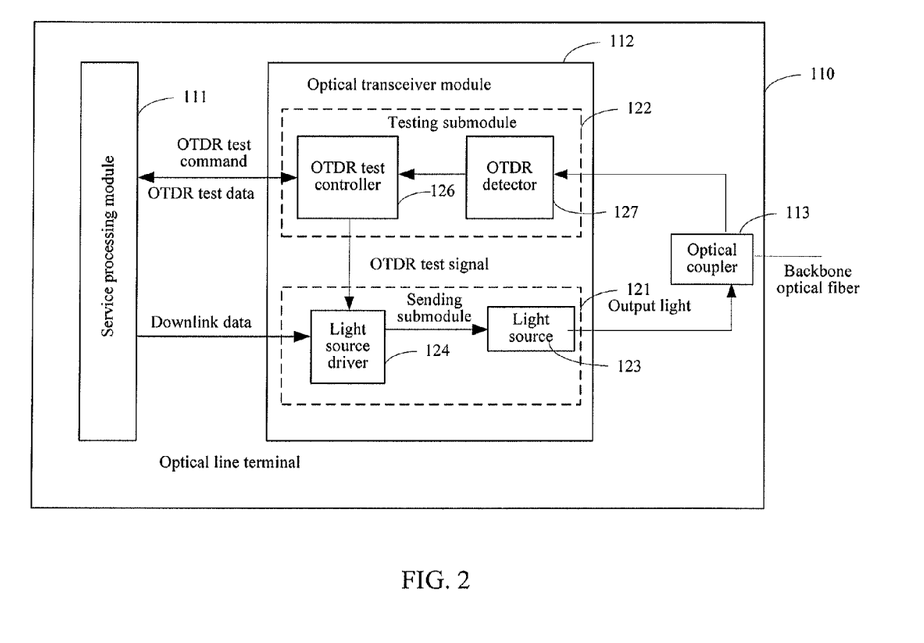
FIG. 2 is a schematic structural diagram of an optical line terminal that is embedded with an apparatus for testing an optical fiber according to an embodiment of the present disclosure.

Referring to FIG. 2 at the same time, in an embodiment, the optical line terminal 110 may include a service processing module 111, an optical transceiver module 112, and an optical coupler 113. The optical transceiver module 112 may include a sending submodule 121 and a testing submodule 122, and the sending submodule 121 and the testing submodule 122 are coupled to a backbone optical fiber of the optical distribution network 130 by using the optical coupler 113. In one aspect, the optical coupler 113 may output an optical signal sent by the sending submodule 121 to the backbone optical fiber. In a specific embodiment, the optical signal sent by the sending submodule 121 may generally include a downlink data signal sent by the optical line terminal 110 to the optical network units 120. In addition, in a period when the optical line terminal is tested, the optical signal sent by the sending submodule 121 may further include a test optical signal that is used to perform optical line detection, where the test optical signal can be overlaid with the downlink data signal. In another aspect, in the test period, the optical coupler 113 may further provide a test optical signal, which is backscattered or reflected on an optical fiber link of the passive optical network 100 and returned to the optical line terminal 110, to the testing submodule 122, where the testing submodule 122 may serve as an apparatus that is embedded in the optical transceiver module 112 for testing an optical fiber, and is configured to detect a test optical signal returned from an optical fiber network.

Certainly, it should be understood that the optical transceiver module 112 may further include a receiving submodule (not shown in the figure), the optical coupler 113 may further provide uplink data signals sent by the multiple optical network units 120 for the receiving submodule, and the receiving submodule is capable of performing optical-to-electrical conversion on the uplink data signals and outputting them to the service processing module 111 for signal processing.

In an embodiment, as shown in FIG. 2, the sending submodule 121 may include a light source 123 and a light source driver 124, where the light source 123 may be a laser diode (Laser Diode, LD), and the light source driver 124 may be a laser diode driver (Laser Diode Driver, LDD). The light source driver 124 is connected between the service processing module 111 and the light source 123, and it is capable of modulating downlink data provided by the service processing module 111 to output light of the light source 123, thereby driving the light source 123 to send a downlink data signal.

In addition, in a test period, the light source driver 124 may further overlay a test signal (such as an OTDR test signal) provided by the testing submodule 122 with the downlink data signal, thereby forming an overlay signal that includes a test optical signal and the downlink data signal; alternatively, in the test period, downlink data sending can be paused, and the light source driver 124 drives only the light source 123 to send a test optical signal. The light source 123 is connected between the light source driver 124 and the optical coupler 113, and it is capable of outputting output light that bears the downlink data signal and/or the test optical signal to the optical distribution network 130 through the optical coupler 113. In a specific embodiment, when the testing submodule 122 starts an OTDR test, the light source driver 124 is capable of receiving a preset test control signal from an upper-layer main control chip or from the service processing module 111, but when the OTDR test is not started or the test ends, the light source driver 124 cannot receive the preset test control signal.

The testing submodule 122 may include an OTDR test controller 126 and an OTDR detector 127. The OTDR test controller 126 is connected to the service processing module 111 through a communications interface, and further connected to the light source driver 124. The OTDR detector 127 is connected between the OTDR test controller 126 and the optical coupler 113. When the test is started, the OTDR test controller 126 is capable of receiving an OTDR test command from the service processing unit 111 through the communications interface, correspondingly starts the OTDR test, and provides an OTDR test signal to the light source driver 124.

In addition, as described above, in the test period, the OTDR test signal can be modulated to the output light of the light source 123 so as to form a test optical signal, which is output to the optical distribution network 130 through the optical coupler 113. The test optical signal is backscattered or reflected at each test point of an optical fiber link, and returned to the optical coupler 113 along the original path. The OTDR detector 127 is capable of collecting the test optical signal returned from the optical coupler 113, preprocesses the test optical signal, and then provides it to the OTDR test controller 126. After the test is complete, the OTDR test controller 126 stops providing the OTDR test signal to the light source driver 124, the service processing module 111 is capable of extracting test data from the OTDR test controller 126 through the communications interface, and performs preset OTDR algorithm calculation. Further, the service processing module 111 or other functional modules (such as an upper-layer software module) of the optical line terminal 110 are capable of presenting a corresponding OTDR test curve according to a calculation result for fault detection and locating.

Figure 3:
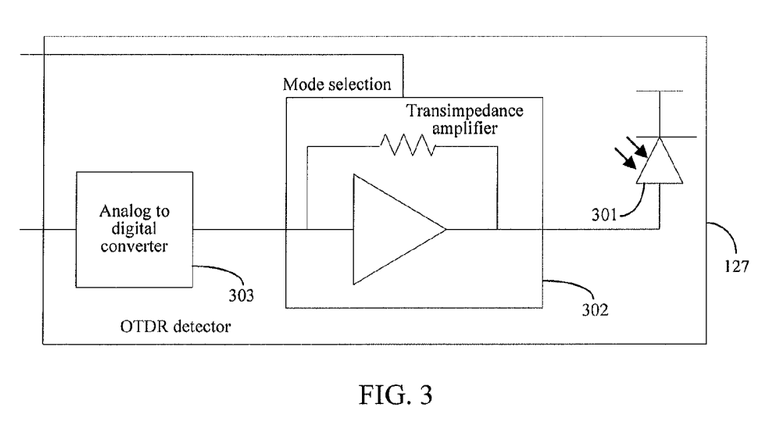
FIG. 3 is a schematic structural diagram of an OTDR detector in an apparatus for testing an optical fiber according to an embodiment of the present disclosure.

Referring to FIG. 3, the OTDR detector 127 may include a photo diode (Photo Diode, PD) 301, a transimpedance amplifier (Transimpedance Amplifier, TIA) 302, and an analog to digital converter (Analog to Digital Converter, ADC) 303, where the photo diode 301, the transimpedance amplifier 302, and the analog to digital converter 303 are connected in turn, and the analog to digital converter 303 is further connected to the OTDR test controller 126.

The photo diode 301 receives the test optical signal returned from the optical distribution network 130, converts the test optical signal into a test current signal, and transmits it to the transimpedance amplifier 302. The transimpedance amplifier 302 receives the test current signal provided by the photo diode 301 and converts it into a test voltage signal. The analog to digital converter 303 performs analog-to-digital conversion on the voltage signal, thereby converting the test voltage signal into a digital signal, which is further output to the OTDR test controller 126 to perform signal processing and acquire a signal characteristic (such as a voltage swing) of the test voltage signal. It should be understood that in a specific embodiment, the analog to digital converter 303 is optional, the transimpedance amplifier 302 may also directly provide the test voltage signal to the OTDR test controller 126, and the OTDR test controller 126 performs analog-to-digital conversion and performs corresponding processing.

A receiver dynamic range of the transimpedance amplifier 302 is mainly related to two indicators, that is, 1 dB compression point input power and a receiver sensitivity, and specifically, the 1 dB compression point input power is input power when a gain of the transimpedance amplifier 302 decreases to 1 dB lower than a linear gain, and the receiver sensitivity reflects minimum input power that can be detected by the transimpedance amplifier 302. The higher the receiver sensitivity is, the lower the minimum input power that can be detected by the transimpedance amplifier 302 is. An upper limit and a lower limit of the receiver dynamic range of the transimpedance amplifier 302 are the 1 dB compression point input power and the minimum input power, respectively.

The transimpedance amplifier 302 may have two modes, that is, a high 1 dB compression point working mode and a high sensitivity working mode, where in the high 1 dB compression point working mode, the 1 dB compression point input power of the transimpedance amplifier is relatively high, but the receiver sensitivity is relatively low; and in the high sensitivity working mode, the 1 dB compression point input power of the transimpedance amplifier is relatively low, but the receiver sensitivity is relatively high. That is to say, assume that in the high 1 dB compression point working mode, the transimpedance amplifier 302 has first 1 dB compression point input power and a first sensitivity, and in the high sensitivity working mode, the transimpedance amplifier 302 has second 1 dB compression point input power and a second sensitivity. In this case, the first 1 dB compression point input power is higher than the second 1 dB compression point input power, but the first receiver sensitivity is lower than the second receiver sensitivity. As described above, the upper limit and the lower limit of the receiver dynamic range of the transimpedance amplifier 302 are the 1 dB compression point input power and the minimum input power related to the receiver sensitivity, respectively. Therefore, an upper limit and a lower limit of a receiver dynamic range when the transimpedance amplifier 302 works in the high 1 dB compression point working mode are different from those when the transimpedance amplifier 302 works in the high sensitivity working mode. For ease of description, the high 1 dB compression point working mode and the high sensitivity working mode are respectively called a first mode and a second mode below.

In this embodiment of the present disclosure, a mode selection end can be arranged in the transimpedance amplifier 302, and it can be configured to receive a mode selection signal from the OTDR test controller 126. The OTDR test controller 126 may provide the mode selection signal to the transimpedance amplifier 302 according to an output signal characteristic (such as a voltage swing of a test voltage signal) of the OTDR detector 127. The transimpedance amplifier 302 may further select a corresponding working mode for work according to the mode selection signal.

Based on the structure of the testing submodule provided in FIG. 2 and FIG. 3, an embodiment of the present disclosure provides a method for testing an optical fiber. In the method for testing an optical fiber, a transimpedance amplifier of an OTDR detector may selectively adjust a receiver dynamic range through a working mode switchover, so as to support receiving a strong test signal and a weak test signal.

Figure 4:
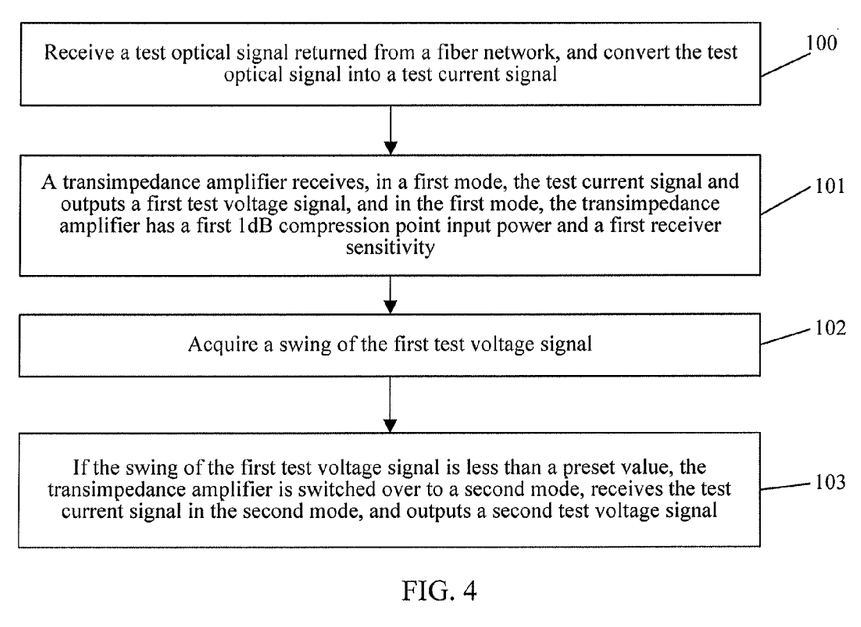
FIG. 4 is a schematic flowchart of a method for testing an optical fiber according to an embodiment of the present disclosure.

As shown in FIG. 4, a method for testing an optical fiber according to an embodiment of the present disclosure includes the following:

Step 100: A photo diode receives a test optical signal returned from an optical fiber network (such as an optical distribution network), and converts the test optical signal into a test current signal through optical-to-electrical conversion.

Step 101: A transimpedance amplifier receives, in a preset mode, the test current signal and outputs a first test voltage signal, where the preset mode may be a first mode, and in the first mode, the transimpedance amplifier has first 1 dB compression point input power and a first receiver sensitivity.

Step 102: Acquire a swing of the first test voltage signal.

For example, an OTDR detector may convert, by using an digital to analog converter, the first test voltage signal output by the transimpedance amplifier into a digital signal and outputs it to an OTDR test controller, and the OTDR test controller may further process the digital signal and acquire a voltage swing of the first test voltage signal; and in another embodiment, the OTDR detector may also directly output the first test voltage signal to the OTDR test controller, and the OTDR test controller receives the first test voltage signal and acquires its voltage swing.

Step 103: If the swing of the first test voltage signal is less than a preset value, the transimpedance amplifier receives, in a second mode, the test current signal and outputs a second test voltage signal, where in the second mode, the transimpedance amplifier has second 1 dB compression point input power and a second receiver sensitivity, the second 1 dB compression point input power is lower than the first 1 dB compression point input power, and the second receiver sensitivity is higher than the first receiver sensitivity.

For example, after acquiring the voltage swing of the first test voltage signal, the OTDR test controller may determine whether the swing of the first test voltage signal is less than the preset value. If yes, the OTDR test controller may output a mode selection signal to the transimpedance amplifier to instruct the transimpedance amplifier to switch over to the second mode, and after switching over to the second mode, the transimpedance amplifier further receives, in the second mode, the test current signal and output the second test voltage signal.

Specifically, a swing of a test voltage signal is capable of reflecting input power of the transimpedance amplifier, and when the input power is greater than a certain value, receiver saturation will be caused to the transimpedance amplifier. Firstly, whether the swing of the first test voltage signal is less than the preset value is determined. If yes, receiver saturation is not caused to the transimpedance amplifier due to relatively high input power when detection is performed in the second mode of a relatively high receiver sensitivity. Therefore the test current signal can be detected for a second time in the second mode, and the transimpedance amplifier can be switched over to the first mode to detect the test current signal. If not, receiver saturation is caused to the transimpedance amplifier due to the relatively high input power when the detection is performed in the second mode of the relatively high receiver sensitivity, and therefore the test current signal can be detected only in the first mode.

Figure 5:
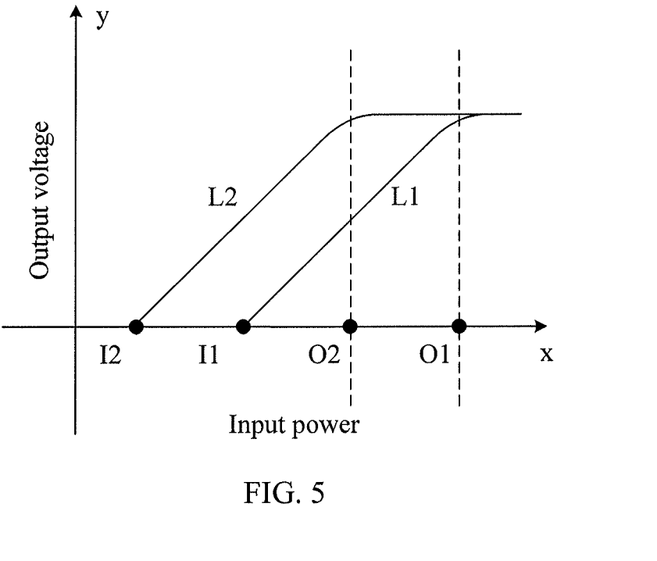
FIG. 5 is a line graph of a relationship between input power and an output voltage of a transimpedance amplifier in the method for testing an optical fiber shown in FIG. 4.

As shown in FIG. 5, x-axis indicates input power of the transimpedance amplifier, y-axis indicates an output voltage of the transimpedance amplifier, two curves L1 and L2 are respective curves when the output voltage of the transimpedance amplifier varies depending on the input power in the first mode and the second mode, and a slope of each curve indicates a gain. Second 1 dB compression point input power O2 is lower than first 1 dB compression point input power O1, and the second receiver sensitivity is higher than the first receiver sensitivity, that is, minimum input power I2 in the first mode is lower than minimum input power I1 in the second mode. In this case, a test signal can be detected in high sensitivity mode and high 1 dB compression point input power mode.

Figure 6:
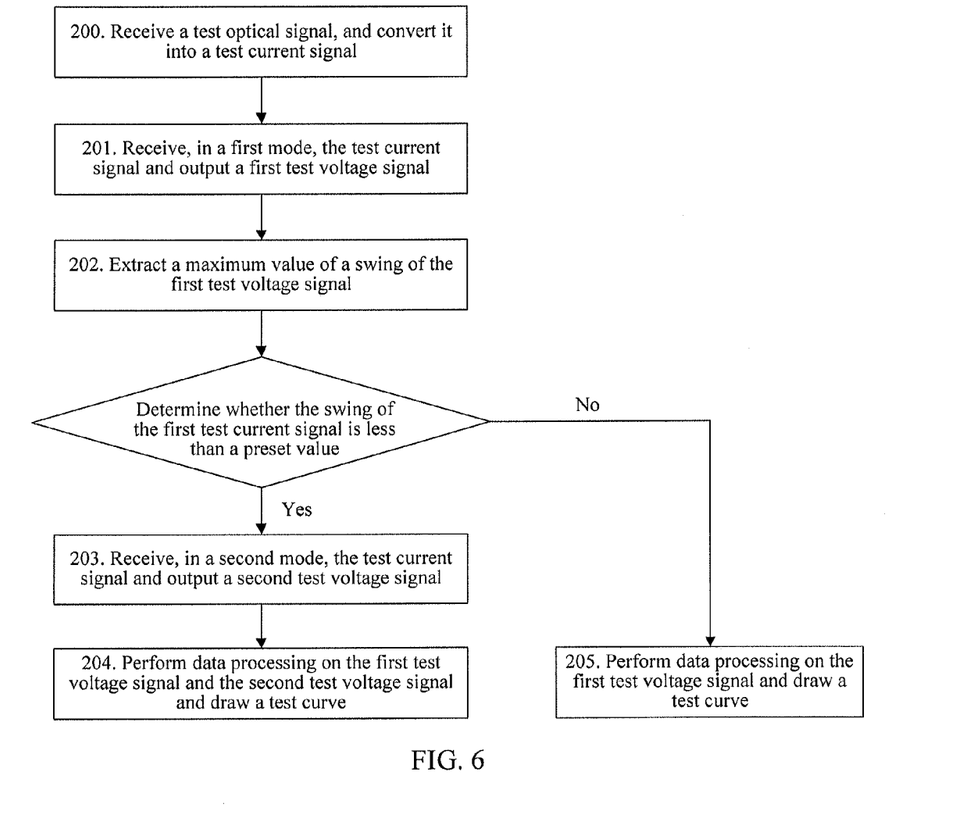
FIG. 6 is a schematic flowchart of another method for testing an optical fiber according to an embodiment of the present disclosure.

Therefore, due to a limitation on a current power supply capability, improving a sensitivity will reduce 1 dB compression point input power, and a receiver dynamic range of the transimpedance amplifier cannot be further enlarged. However, upper limits and lower limits of receiver dynamic ranges of the transimpedance amplifier in the first mode and the second mode are different, and therefore a transimpedance amplifier switchover between the first mode and the second mode is equivalent to moving the receiver dynamic range of the transimpedance amplifier according to an actual test requirement, thereby enlarging a valid detection range. As shown in FIG. 5, the transimpedance amplifier is capable of enlarging a detection range from the I2 to the O2 to a detection range from the I1 to the O1, and compared with a detection range of a test signal in the prior art, that is, a receiver dynamic range of the transimpedance amplifier in a single mode, a detection range of the test signal is enlarged. As shown in FIG. 6, a method for testing an optical fiber according to another embodiment of the present disclosure includes the following:

Step 200: A photo diode receives a test optical signal returned from an optical fiber network (such as an optical distribution network), and converts the test optical signal into a test current signal through optical-to-electrical conversion.

Step 201: A transimpedance amplifier receives, in a first mode, the test current signal and outputs a first test voltage signal, where in the first mode, the transimpedance amplifier has first 1 dB compression point input power and a first receiver sensitivity.

Step 202: Acquire a swing of the first test voltage signal. If the swing of the first test voltage signal is less than a preset value, go to step 203, and if the swing of the first test voltage signal is not less than the preset value, go to step 205.

Step 203: The transimpedance amplifier receives, in a second mode, the test current signal and outputs a second test voltage signal, where in the second mode, the transimpedance amplifier has second 1 dB compression point input power and a second receiver sensitivity, the second 1 dB compression point input power is lower than the first 1 dB compression point input power, and the second receiver sensitivity is higher than the first receiver sensitivity.

Step 204: Perform data processing on the first test voltage signal and the second test voltage signal and draw a test curve, thereby implementing fault analysis on the optical fiber network.

Step 205: Perform data processing on the first test voltage signal and draw a test curve, thereby implementing fault analysis on the optical fiber network.

The second 1 dB compression point input power is lower than the first 1 dB compression point input power, and the second receiver sensitivity is higher than the first receiver sensitivity, that is, when a receiver dynamic range amplitude remains unchanged, minimum input power of the transimpedance amplifier in the first mode is lower than minimum input power in the second mode. Therefore, same as the previous embodiment, the method for testing an optical fiber provided by this embodiment may also effectively enlarge a detection range of a test signal.

It should be understood that in the methods for testing an optical fiber according to the above two embodiments, a preset working mode of the transimpedance amplifier is the first mode, that is, the transimpedance amplifier firstly works in the first mode, and is switched over to the second mode for work when a swing of a test voltage signal output by the transimpedance amplifier in the first mode is less than a preset value; and in other replaceable embodiments, the preset working mode of the transimpedance amplifier may also be the second mode, that is, the transimpedance amplifier firstly works in the second mode, and needs to be switched over to the first mode for work because receiver saturation is caused to the transimpedance amplifier due to relatively high input power when a swing of a test voltage signal output by the transimpedance amplifier in the second mode is greater than the preset value.

Through the foregoing description of the embodiments, it is clear to persons skilled in the art that the present disclosure may be implemented by software plus necessary universal hardware, and definitely may also be implemented by hardware, but in many cases, the software implementation is preferred. Based on such an understanding, the solutions of the present disclosure essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, or a network device) to perform the methods described in the embodiments of the present disclosure.

The foregoing descriptions are merely specific embodiments of the present disclosure, but are not intended to limit the protection scope of the present disclosure. Any variation or replacement readily figured out by persons skilled in the art within the scope disclosed in the present disclosure shall fall within the protection scope of the present disclosure. Therefore, the protection scope of the present disclosure shall be subject to the protection scope of the claims.

What is claimed is:

1. A method for testing an optical fiber, comprising:
receiving a test optical signal from an optical fiber network, and converting the test optical signal into a test current signal;
receiving, by a transimpedance amplifier, the test current signal by using a first working mode and outputting a first test voltage signal;
acquiring a swing of the first test voltage signal, and determining whether the swing of the first test voltage signal meets a preset condition; and
receiving, by the transimpedance amplifier, the test current signal by using a second working mode and outputting a second test voltage signal when the swing of the first test voltage signal meets the preset condition, wherein an upper limit and a lower limit of a receiver dynamic range when the transimpedance amplifier works in the first working mode are different from those when the transimpedance amplifier works in the second working mode.

2. The method according to claim 1, wherein the first working mode is a high 1 dB compression point working mode, the second working mode is a high sensitivity working mode, and the preset condition is that the swing of the first test voltage signal is less than a preset value.

3. The method according to claim 2, wherein the transimpedance amplifier has first 1 dB compression point input power and a first receiver sensitivity in the first working mode, and has second 1 dB compression point input power and a second receiver sensitivity in the second working mode; and the second 1 dB compression point input power is lower than the first 1 dB compression point input power, and the second receiver sensitivity is higher than the first receiver sensitivity.

4. The method according to claim 1, wherein the first working mode is a high sensitivity working mode, the second working mode is a high 1 dB compression point working mode, and the preset condition is that the swing of the first test voltage signal is greater than a preset value.

5. The method according to claim 4 wherein
the transimpedance amplifier has first 1 dB compression point input power and a first receiver sensitivity in the first working mode, and has second 1 dB compression point input power and a second receiver sensitivity in the second working mode; and the second 1 dB compression point input power is higher than the first 1 dB compression point input power, and the second receiver sensitivity is lower than the first receiver sensitivity.

6. The method according to claim 1,
after outputting a second test voltage signal, further comprising:
performing fault analysis on the optical fiber network according to the first test voltage signal and the second test voltage signal.

7. The method according to claim 1, further comprising:
performing fault analysis on the optical fiber network according to the first test voltage signal when the swing of the first test voltage signal does not meet the preset condition.

8. An apparatus for testing an optical fiber, comprising:
an optical detector, configured to receive a test optical signal from an optical fiber network, and convert the test optical signal into a test current signal; and
a transimpedance amplifier, connected to the optical detector and configured to receive the test current signal by using a first working mode and convert the test current signal into a first test voltage signal, and receive the test current signal by using a second working mode and convert the test current signal into a second test voltage signal when a swing of the first test voltage signal meets a preset condition, wherein when working in the first working mode and the second working mode, the transimpedance amplifier respectively has a first receiver dynamic range and a second receiver dynamic range, and an upper limit and a lower limit of the first receiver dynamic range are different from those of the second receiver dynamic range.

9. The apparatus according to claim 8, further comprising: a test controller, configured to acquire the swing of the first test voltage signal, and provide a mode selection signal to the transimpedance amplifier to control the transimpedance amplifier to switch over to the second working mode when determining that the swing of the first test voltage signal meets the preset condition.

10. The apparatus according to claim 9, wherein the first working mode is a high 1 dB compression point working mode, the second working mode is a high sensitivity working mode, and the preset condition is that the swing of the first test voltage signal is less than a preset value.

11. The apparatus according to claim 10, wherein the transimpedance amplifier has first 1 dB compression point input power and a first receiver sensitivity in the first working mode, and has second 1 dB compression point input power and a second receiver sensitivity in the second working mode; and the second 1 dB compression point input power is lower than the first 1 dB compression point input power, and the second receiver sensitivity is higher than the first receiver sensitivity.

12. The apparatus according to claim 9, wherein the first working mode is a high sensitivity working mode, the second working mode is a high 1 dB compression point working mode, and the preset condition is that the swing of the first test voltage signal is greater than a preset value.

13. The apparatus according to claim 12, wherein the transimpedance amplifier has first 1 dB compression point input power and a first receiver sensitivity in the first working mode, and has second 1 dB compression point input power and a second receiver sensitivity in the second working mode; and the second 1 dB compression point input power is higher than the first 1 dB compression point input power, and the second receiver sensitivity is lower than the first receiver sensitivity.

* * * * *